United States Patent
Shimonishi

(10) Patent No.: US 7,778,164 B2
(45) Date of Patent: Aug. 17, 2010

(54) COMMUNICATION APPARATUS AND COMMUNICATION METHOD FOR IMPLEMENTING A COMMUNICATION SESSION BASED UPON A CONGESTION WINDOW

(75) Inventor: Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1207 days.

(21) Appl. No.: 11/342,666

(22) Filed: Jan. 31, 2006

(65) Prior Publication Data

US 2006/0171313 A1    Aug. 3, 2006

(30) Foreign Application Priority Data

Feb. 3, 2005    (JP)    ............... 2005-027684

(51) Int. Cl.
*G01R 31/08*    (2006.01)
(52) U.S. Cl. ...................................... 370/229
(58) Field of Classification Search ................. 370/229, 370/230, 235, 231, 254, 465, 468
See application file for complete search history.

(56) References Cited

U.S. PATENT DOCUMENTS

| | | | |
|---|---|---|---|
| 6,621,799 B1 * | 9/2003 | Kemp et al. ................. | 370/282 |
| 6,622,172 B1 * | 9/2003 | Tam ............................ | 709/232 |
| 7,089,282 B2 * | 8/2006 | Rajamony et al. .......... | 709/203 |

FOREIGN PATENT DOCUMENTS

| | | |
|---|---|---|
| JP | 9-284338 A | 10/1997 |
| JP | 11-243419 A | 9/1999 |
| JP | 11-261631 A | 9/1999 |
| JP | 2000-253096 A | 9/2000 |
| JP | 2001-160824 A | 6/2001 |
| JP | 2004-80413 A | 3/2004 |

OTHER PUBLICATIONS

W. Stevens, "TCP Slow Start, Congestion Avoidance, Fast Retransmit, and Fast Recovery Algorithms," Network Working Group, NOAO, Jan. 1997.
Chang Jin, et al. "Fast TCP for High-Speed Long-Distance Networks," Internet Engineering Task Force, Caltech, Jun. 2003.
Ren Wang, et al. "Efficiency/Friendliness Tradeoffs in TCP Westwood," UCLA Computer Science Department, 2002.
S. Floyd, "High Speed TCP for Large Congestion Windows," Network Working Group, ICSI, Dec. 2003.

* cited by examiner

*Primary Examiner*—Kwang B Yao
*Assistant Examiner*—Anh Ngoc Nguyen
(74) *Attorney, Agent, or Firm*—Sughrue Mion, PLLC

(57) ABSTRACT

A communication apparatus for implementing a communication session based upon a congestion window specifying a signal amount that can be sent out continuously to a network employs a signal propagation time in the communication session, thereby to estimate a congestion degree of a bottleneck circuit, and decides an increased-width of the congestion window in a congestion avoidance action based upon the estimated circuit congestion degree. As the increased-width, the smaller value is decided as the estimated circuit congestion degree increases. When the communication apparatus enlarges the congestion window, it employs the decided increased-width, thereby to calculate size of the congestion window that should be applied.

29 Claims, 9 Drawing Sheets

COMMUNICATION APPARATUS AND COMMUNICATION METHOD FOR IMPLEMENTING A COMMUNICATION SESSION BASED UPON A CONGESTION WINDOW

BACKGROUND OF THE INVENTION

The present invention relates to a communication apparatus and a communication method for implementing a communication session via a network, and in particular, to a communication apparatus and a communication method in which a communication protocol having a congestion control function such as a TCP (Transmission Control Protocol) is employed.

The TCP, which is known as a protocol of a layer 4 for data communication in an internet, is a protocol for providing highly reliable communication with connection-oriented communication. This TCP, which includes a congestion control function of adequately adjusting a congestion window responding to a congestion situation of the network, allows a transmission bandwidth to be increased by enlarging the congestion window during the time that no congestion occurs in the network, and the transmission bandwidth to be decreased by reducing the congestion window in a case where the network is congested.

Conventionally, out of versions that have been offered with respect to the TCP, there exists the so-called "TCP-Reno" as the version having fast recovery algorithms employed, which is mentioned in Non-patent Document 1 to be later described that specifies the above-mentioned congestion control function. In this "TCP-Reno", as an action at the moment of enlarging the congestion window, there exist a slow start action for quickly enlarging the congestion window until a pre-set threshold is reached and a congestion avoidance action for enlarging the congestion window more slowly than in the slow start period after the window size has reached a threshold.

When packet discarding has been detected in the above-mentioned congestion avoidance action, the communication apparatus reduces size of the congestion window into one-half of the current one under the judgment that the network is in a state of congestion, thereby allowing the transmission bandwidth to be decreased. On the other hand, while the packet discarding is not detected, enlarging the congestion window linearly by each one MSS (Maximum Segment Size) under the judgment that the network is not in a state of congestion allows the transmission bandwidth to be slowly increased. This control is generally referred to as an AIMD (Additive Increase Multiple Decrease) control.

By the way, while the "TCP-Reno" is applied, there exists the problem that, when the packet discarding occurs, the size of the congestion window is halved for the time being, whereby thereafter, a throughput that is originally to be expected is not obtained until the window size is increased into a fully large one. This is a serious problem, in particular, for the circuit providing high-speed communication, the circuit of which a round-trip propagation delay time (hereinafter, referred to as a RTT) is originally lengthy, the wireless circuit in which the packet discarding could occur due to the cause other than the congestion, or the like. Conventionally, the arts as mentioned below have been offered for this problem.

A first prior art is for giving some kind of information as to whether or not the packet discarding is due to the congestion to a terminal from a network at the moment that the packet discarding has occurred. With this technology, for example, in Patent Document 1 to be later described is listed the technology that ELN (Explicit Loss Notification) information is transmitted to a transmission terminal from a reception terminal at the moment that the packet discarding has occurred due to an error of the circuit, and the transmission terminal does not reduce the congestion window unnecessarily in a case where the packet discarding is not due to the congestion. Moreover, the similar technology is listed in Patent Document 2 as well to be later described. Yet furthermore, in Patent Document 3 to be later described is listed the technology that quality information of the wireless circuit is given to the transmission terminal to make a switchover to the congestion window control technique suitable for the wireless circuit when quality of the wireless circuit is bad, thereby allowing the congestion window not to be reduced unnecessarily.

In a second prior art, instead of immediately judging that occurrence of the packet discarding has been triggered by the congestion occurrence, information that a TCP transmission terminal has is employed, thereby to make a congestion judgment. With this technology, for example, in Patent Document 4 to be later described is listed the technology that measuring the RTT of the circuit to determine that no congestion occurs in a case where its RTT has a constant value or less allows the congestion window not to be reduced also in a case where the packet discarding has been detected.

A third prior art is for, while taking a congestion window control by means of the AIMD control similar to the "TCP-Reno", changing its operational parameter. With this technology, for example, in Non-patent Document 2 to be later described is listed the technology that setting an increased-width of the congestion window so that it becomes larger as compared with the case of the "TCP-Reno" while no packet discarding occurs, and setting a reduced-width of the congestion window so that it becomes smaller as compared with the case of the "TCP-Reno" when the packet discarding has occurred allow a high throughput to be obtained also in environments in which the packet discarding occurs frequently.

A fourth prior art, which does not relate to the AIMD control of the "TCP-Reno", is for calculating the size of the ideal congestion window which is a target and for taking a control so that the congestion window is induced to assume its value. With this technology, for example, in Non-patent Document 3 to be later described is listed the technology of calculating the value of the ideal congestion window by employing the current RTT and the current congestion window to decided the increased-width or the reduced-width of the congestion window based upon a difference between its value and the current congestion window. This technology of the Non-patent Document 3 allows the size of the congestion window also that should be increased to be enlarged in a case where the current congestion window is remarkably smaller than the ideal congestion window, whereby resultantly, the throughput can be increased at a high speed.

[Patent Document 1] JP-P2004-80413A
[Patent Document 2] JP-P1999-243419A
[Patent Document 3] JP-P2000-253096A
[Patent Document 4] JP-P2001-160824A
[Non-patent Document 1] W. Stevens, "TCP Slow Start, Congestion Avoidance, Fast Retransmit, and Fast Recovery Algorithms", [online], January, 1997, Network Working Group/RFC2001, [Retrieval: Jan. 21, 2005]
[Non-patent Document 2] S. Floyd, "High Speed TCP for Large Congestion Windows", [online], December, 2003, Network Working Group/RFC3649, [Retrieval: Jan. 21, 2005]
[Non-patent Document 3] Cheng Jin, David X. Wei and Steven H. Low, "FAST TCP for High-Speed Long-Distance Networks", [online], June, 2003, Internet Engineering Task Force/INTERNET DRAFT/draft-jwl-tcp-fast-01.txt, [Retrieval: Jan. 21, 2005]

[Non-patent Document 4] R. Wang, M. Valla, M. Y. Sanadidi, B. K. F. Ng and M. Gerla, "Efficiency/Friendliness Tradeoffs in TCP Westwood", [online], May 15, 2002, UCLA Computer Science Department [Retrieval: Jan. 21, 2005]

The controversial point of the first prior art is that introduction thereof is difficult because a mechanism for notifying the terminal of the cause of the packet discarding and the situation of the wireless circuit is required for the network. In particular, in a case where the terminal connected to the wireless circuit makes communication with the unspecified number of the terminals that have not been connected to its wireless circuit, it is not easy to introduce the above mechanism into all of the unspecified number of the terminals, i.e. the latter. Furthermore, it is difficult to apply the similar mechanism for the wire circuit.

The controversial point of the second prior art is that there exists uncertainty as to the congestion judgment based upon the RTT. A range of the value that the RTT is allowed to assume depends upon a buffer capacity of a router, whereby the most suitable RTT threshold, which is employed for making a congestion judgment, is difficult to decide uniquely. That is, the larger the buffer capacity of the router is, the widely the range of the value that the RTT is allowed to assume spreads, whereby even though a constant RTT threshold is set for the terminal, it is more easily judged that the congestion has occurred at the time of using the circuit in which the buffer capacity of the router is relatively small than at the time of using the circuit in which the buffer capacity of the router is relatively large. Doing so gives a rise to the possibility of judging that the congestion has occurred although the fact is that slight congestion has occurred, and resultantly, the throughput lowers due to the unnecessary reduction control of the congestion window. Contrarily, in a case where the buffer capacity is relatively large, there is the possibility of judging that the congestion has not occurred yet notwithstanding the situation where it should be judged that the congestion has occurred, and in this case, the congestion window that should be reduced is not reduced, and resultantly, the problem arises that the congestion cannot be avoided.

The controversial point of the third prior art is that it is difficult to cause the session with this technology and the existing "TCP-Reno" session to coexist in a network, and there exists the problem that the throughput of the "TCP-Reno" session lowers in a case of competing with the "TCP-Reno" session. That is, in the third prior art, the increased-width of the congestion window during the time that the packet discarding is not detected is set so that it becomes larger as compared with the case of "TCP-Reno", and furthermore, the reduced-width of the congestion window at the time of detecting the packet discarding is set so that it becomes smaller as compared with the case of "TCP-Reno", whereby the congestion window size is always larger as compared with the case of "TCP-Reno", which causes the throughput of the "TCP-Reno" to be lowered resultantly.

The controversial point of the fourth prior art is that coexistence with the existing "TCP-Reno" session, which holds a network in common is difficult similarly to the above-mentioned third prior art, and in a case of competing with the "TCP-Reno" session, the throughput becomes smaller as compared with that of the "TCP-Reno" session. In this prior art, the value of the ideal congestion window becomes smaller than that of the current congestion window as the RTT becomes large, whereby during this period, the increased-width of the congestion window becomes negative even though the packet discarding has not been detected. On the other hand, in the "TCP-Reno", the congestion window keeps to be always increased until the packet discarding is detected irrespective of the size of the RTT. For this, in a case where these compete with each other, there exists the problem that the throughput of the TCP session with this prior art lowers.

SUMMARY OF THE INVENTION

The present invention has been accomplished in consideration of the above-mentioned problems, and an object thereof is to provide a technique of aiming at an improvement of the throughput during a congestion avoidance action in a communication session while taking the congestion situation of a network into consideration.

So as to accomplish the above-mentioned object, the communication apparatus relating to the present invention, which is a communication apparatus for implementing a communication session based upon a congestion window for specifying a signal amount that can be continuously sent out to a network, includes a means for deciding size of the congestion window that should be applied, a means for employing a signal propagation time in the communication session, thereby to estimate a congestion degree of a bottleneck circuit, and a means for deciding an increased-width of the congestion window in the congestion avoidance action based upon the estimated circuit congestion degree.

The communication method relating to the present invention is a method in which the communication apparatus for implementing the communication session based upon the congestion window for specifying a signal amount that can be continuously sent out to a network employs a signal propagation time in the communication session, thereby to estimate a congestion degree of the bottleneck circuit, decides an increased-width of the congestion window in the congestion avoidance action based upon the estimated circuit congestion degree, and decides size of the congestion window that should be applied based upon the increased-width when the congestion window is enlarged.

The present invention enables the window size suitable for the situation of the bottleneck circuit at the current time point to be set because the increased-width of the congestion window during the congestion avoidance is decided based upon the congestion degree of the bottleneck circuit estimated by employing the signal propagation time. This allows the frequency of the packet discarding in the congestion avoidance action to be prevented, and in addition hereto, the throughput to be smoothly enhanced.

BRIEF DESCRIPTION OF THE DRAWING

This and other objects, features and advantages of the present invention will become more apparent upon a reading of the following detailed description and a drawing, in which.

DESCRIPTION OF THE EMBODIMENTS

First Embodiment

Figure 1:
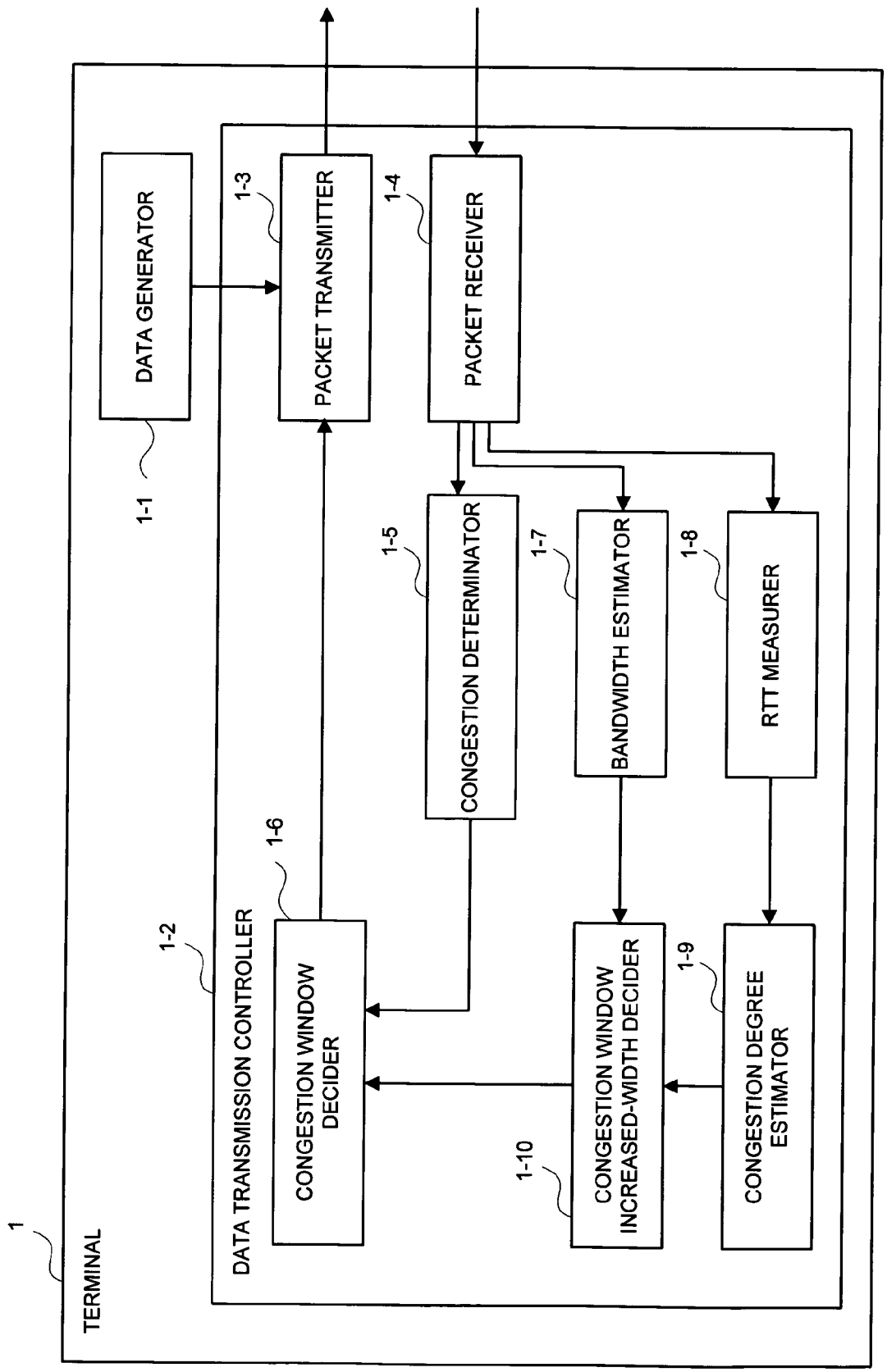
FIG. 1 is a block diagram illustrating a configuration of a first embodiment of the present invention.

FIG. 1 is a block diagram illustrating a configuration of the first embodiment of the present invention. A terminal 1 as a communication apparatus relating to the present invention includes a data generator 1-1 for generating transmission data, and a data transmission controller 1-2 for outputting the transmission data to a network as shown in FIG. 1. The terminal 1 of this embodiment is an apparatus for making connection-oriented communication based upon the TCP that is a communication protocol of the layer 4.

The data transmission controller 1-2 includes a packet transmitter 1-3 for transmitting a packet to the network, a packet receiver 1-4 for receiving the packet from the network, a congestion determinator 1-5 for determining existence of the packet discarding, a congestion window decider 1-6 for deciding the size of the congestion window, a bandwidth estimator 1-7 for estimating a bandwidth of the circuit that has become a bottleneck in the communication session, an RTT measurer 1-8 for measuring an RTT as a signal propagation time in the present invention, a congestion degree estimator 1-9 for estimating a congestion degree of the current bottleneck circuit from the measured RTT, and a congestion window increased-width decider 1-10 for deciding an increased-width of the congestion window during the congestion avoidance action based upon the estimated circuit bandwidth and congestion degree.

Additionally, the so-called congestion avoidance action in the TCP is, as known conventionally, an action of, after the congestion window rapidly has enlarged up to a predetermined size in a slow start period, enlarging the congestion window more slowly than at the time of the slow start, and in particular, in the congestion avoidance action with the "TCP-Reno", the size of the congestion window is increased by an increased-width of one MSS for each one RTT period.

Figure 2:
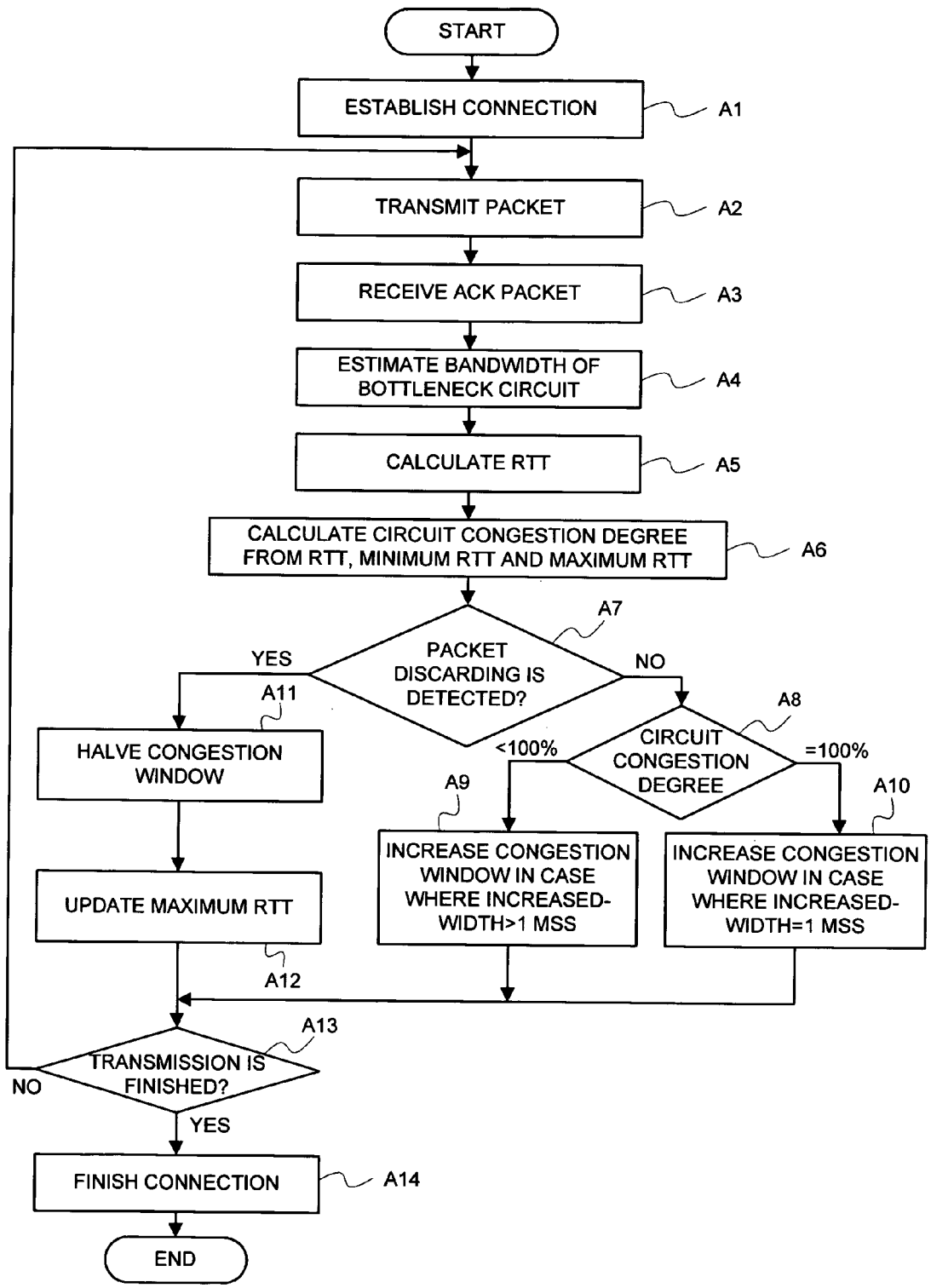
FIG. 2 is a flowchart illustrating an operational procedure of the first embodiment.

FIG. 2 is a flowchart illustrating an operational procedure of this embodiment. The operation of this embodiment will be explained by making a reference to FIG. 1 and FIG. 2.

The terminal 1 establishes a TCP connection between its own terminal and a terminal that becomes a communication companion (step A1), and initiates transmission of the transmission data generated in the data generator 1-1 (step A2). The packet transmitter 1-3 packetizes the generated data, and outputs this to the network according to the value of the current congestion window. When a reception acknowledgment packet (ACK packet) is sent back by the terminal on the reception side (illustration is omitted) for the packet transmitted from the terminal 1, the packet receiver 1-4 receives it (step A3).

The bandwidth estimator 1-7 employs the received ACK packet, thereby to estimate a bandwidth of the bottleneck circuit (step A4). As a method of estimation can be employed, for example, the method of estimating the bandwidth from one obtained by dividing the data amount of two transmission packets, which two continuously-received ACK packets indicate, by an arrival time interval of the ACK packet. This method is described in details, for example, in the Non-patent Document 4, and explanation of its details is omitted herein.

Next, the terminal 1 obtains the RTT from a difference between a time of having transmitted the packet and a time of having received the ACK packet for the above packet in the RTT measurer 1-8 (step A5), and holds the minimum value out of the RTTs obtained in the past as a minimum RTT. This minimum RTT signifies that no occurrence of the congestion existed at its time point, and furthermore, the maximum RTT to be obtained with a procedure to be later described signifies that the congestion occurred at its time point.

The congestion degree estimator 1-9 estimates the circuit congestion degree with the following numerical formula 1 that is defined by the RTT at the current time point, the minimum RTT and the maximum RTT (step A6).

$$P = 1/e^{(RTT-(mini\ RTT))/((max\ RTT)-(mini\ RTT))*A}$$ Numerical formula 1

In the above-mentioned numerical formula 1, [p] is the accuracy that the circuit congestion degree is less than 100%, if [p] is [0], it indicates that the circuit congestion degree is 100%, and if [p] is [1], it indicates that the circuit congestion degree is less than 100%. Furthermore, the value, which enables [eA] to be fully enlarged, is set for a constant [A] so that the value of [p] becomes substantially [0], or becomes substantially [1] in the numerical formula 1. Herein, when the RTT is equal to the minimum RTT, it follows that [p=1], and the circuit congestion degree is judged to be less than 100%. Furthermore, when the RTT is equal to the maximum RTT, it follows that [p≈1], and the circuit congestion degree is judged to be 100%.

Additionally, the function for estimating the circuit congestion degree, which is a function having the characteristic that the numerical formula 1 has, i.e. the characteristic such that the circuit congestion degree becomes less than 100% when the RTT is equal to the minimum RTT and yet the circuit congestion degree becomes 100% when the RTT is equal to the maximum RTT, is not limited to the numerical formula 1, and can be appropriately employed. Furthermore, in a case where error components are numerously included in the measured RTT, a moving average of the RTTs may be employed instead of the RTT in order to remove the error.

The congestion determinator 1-5 confirms whether or not the ACK packet has arrived appropriately for the transmission packet, and judges that the transmission packet has not been discarded in a case where it has arrived appropriately (step A7: No). In this case, the congestion window decider 1-6 increases the congestion window according to the increased-width that the congestion window increased-width decider 1-10 has decided with the next method, under the judgment that the throughput is increaseable.

The congestion window increased-width decider 1-10 obtains an increased-width (I) of the congestion window with the next numerical formula 2 employing the bandwidth of the bottleneck circuit estimated by the above-mentioned bandwidth estimator 1-7 and the circuit congestion degree (p) estimated by the congestion degree estimator 1-9.

$$I = (\text{estimated bandwidth}) * p * B + 1 MSS$$ Numerical formula 2

Herein, [I] is the increased-width of the congestion window per one RTT period, and [B] is a coefficient for deciding the increased-width. According to the numerical formula 2, in a case where the circuit congestion degree is less than 100% (p=1) (step A8: <100%), the value, which is larger by a segment unit than [1MSS], is acquired as the congestion window increased-width (I) (step A9). Furthermore, in a case where the circuit congestion degree is 100% (p=0) (step A8:

=100%), the congestion window increased-width (I) becomes [1MSS] that is identical to the increased-width specified in the "TCP-Reno", and as a result, the congestion window is enlarged by [1MSS] for each one RTT period (step A10).

Utilizing the bandwidth of the bottleneck circuit like the case of the above-mentioned numerical formula 2 in deciding the increased-width of the congestion window enables the increased-width suitable for its bandwidth to be obtained. That is, according to the numerical formula 2, in a case where the bandwidth is relatively small, the increased-width allowing the congestion window to be gradually enlarged is calculated. This enables the frequency of the packet discarding to be prevented. Furthermore, the increased-width such that the larger the bandwidth is, more rapidly the congestion window is enlarged is calculated, thereby making it possible to realize a high throughput, and resultantly to effectively put the circuit bandwidth to practical use. Additionally, in deciding the increased-width of congestion window, the value suitable for objects that should be taken into consideration, for example, the fixed value, the RTT, the size of the congestion window at the current time point, the buffer capacity of the router or the like can be employed instead of the bandwidth of the bottleneck circuit employed in this embodiment.

On the other hand, in a case where the ACK packet does not reach correctly for the transmission packet, that is, the ACK packet having the identical ACK number has been continuously received three times or more, the congestion determinator 1-5 determines that the packet discarding has occurred (step A7: Yes). In this case, the congestion determinator 1-5 reduces the size of the congestion window into one-half of the current one similarly to the reduction procedure of the congestion window at the time of the occurrence of the packet discarding with the "TCP-Reno" (step A11).

Furthermore, the terminal 1 updates the value of the maximum RTT by the RTT measurer 1-8 (step A12). With respect to the maximum RTT to be employed for updating, for example, the value of the RTT immediately before detecting the packet discarding, or the average value of the RTT values in its neighborhood is held as the maximum RTT. Additionally, in a case where the maximum RTT obtained herein is less than a pre-decided threshold, its threshold is employed as the maximum RTT. As this threshold, for example, the RTT at the current time point, or the value obtained by adding to the value of the minimum RTT a constant value or the value that increases/reduces in proportion to the estimated bandwidth obtained in the bandwidth estimator 1-7 can be employed.

The terminal 1 repeats the above-mentioned procedure until transmission of data that should be transmitted is finished (step A13), and finally, disconnects the TCP connection to finish the communication (step A14).

According to the first embodiment explained above, the congestion window is increased at a high-speed even during the congestion avoidance action in a case where the congestion degree of the bottleneck circuit is low, thereby enabling a decline in the throughput in the congestion avoidance action to be prevented. Furthermore, in a case where the congestion degree is high, the congestion window control similar to the "TCP-Reno" is taken, thereby enabling a decline in the throughput in a case of competing with the "TCP-Reno" session to be also prevented. Furthermore, there is no necessity for a mechanism for notifying the terminal 1 from the network of special information, and besides, the congestion window is controlled irrespectively of the specification on the network side such as the buffer capacity of the router, thereby enabling an enhancement of the throughput to be relatively easily realized.

Second Embodiment

Figure 3:
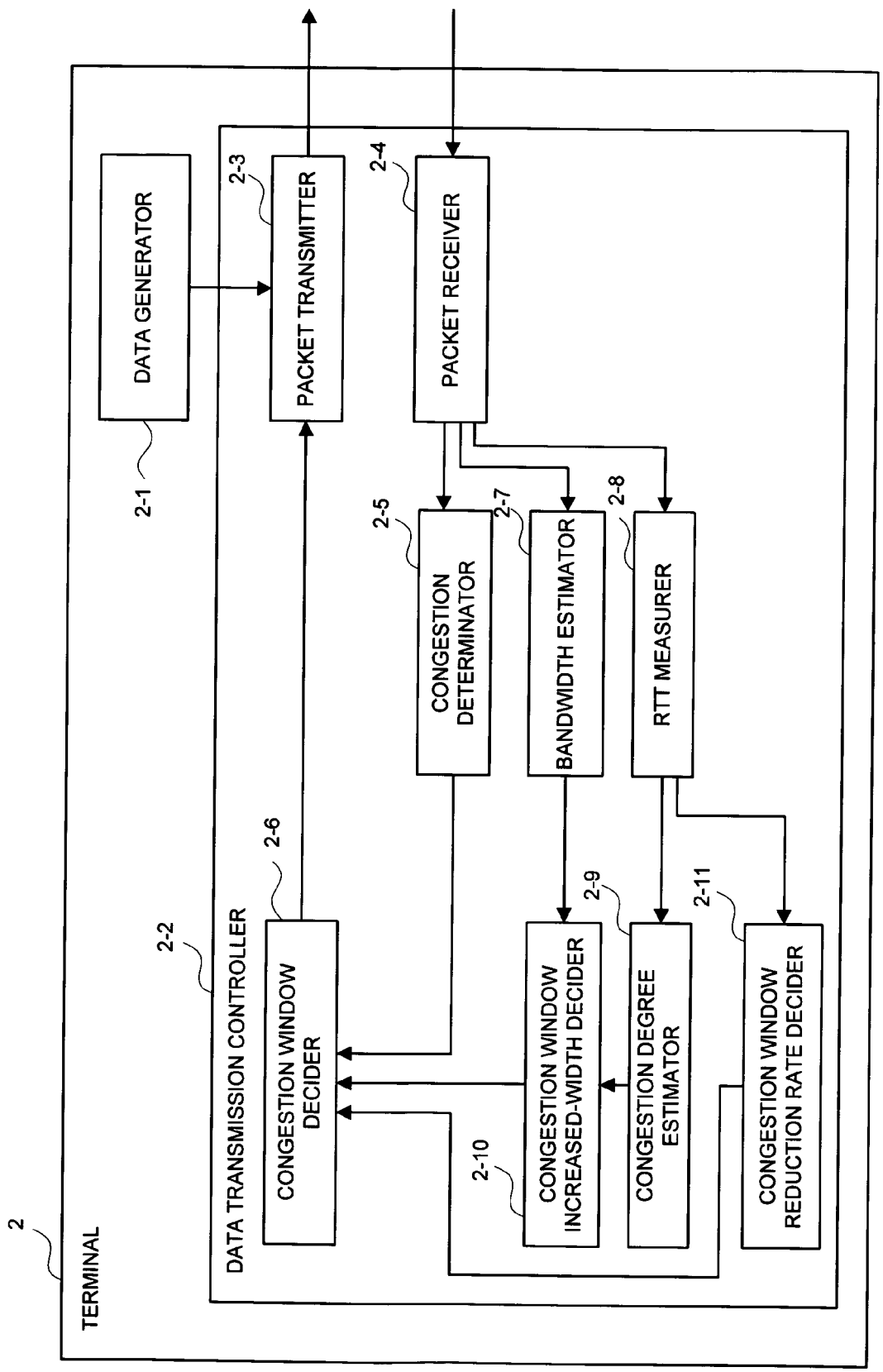
FIG. 3 is a block diagram illustrating a configuration of a second embodiment of the present invention.

FIG. 3 is a block diagram illustrating a configuration of the second embodiment of the present invention. In FIG. 3, codes relating to the codes of FIG. 1 are affixed to the portions that correspond to the configuration shown in FIG. 1. A terminal 2 of this embodiment includes a congestion window reduction rate decider 2-11 for dynamically changing the congestion window reduction rate at the time of detecting the packet discarding in a data transmission controller 2-2 in addition to the configuration of the terminal 1 of FIG. 1.

Figure 4:
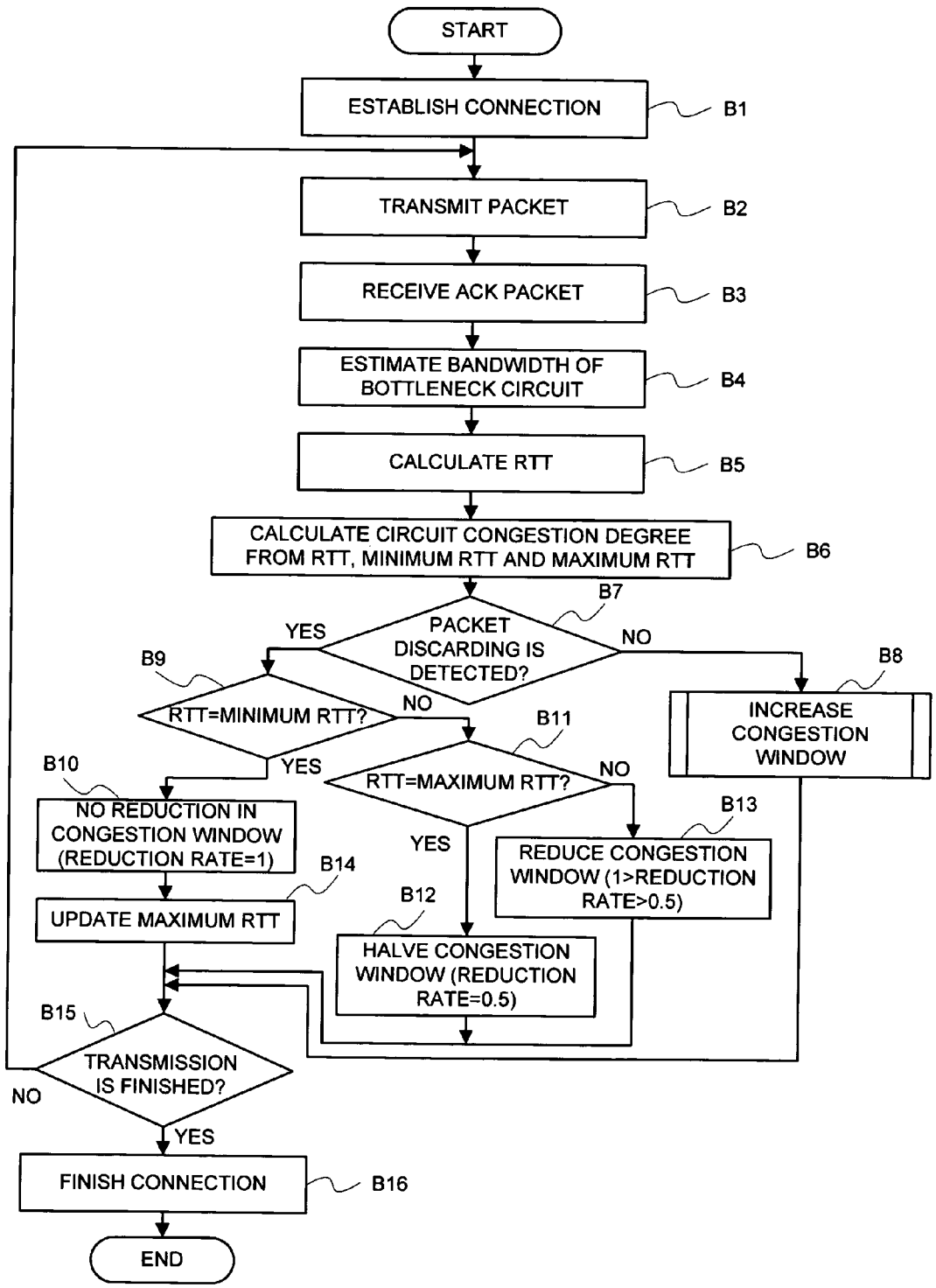
FIG. 4 is a flowchart illustrating an operational procedure of the second embodiment.

FIG. 4 is a flowchart illustrating an operational procedure of this embodiment. The operation of this embodiment will be explained by making a reference to FIG. 3 and FIG. 4. Additionally, in the procedure shown in FIG. 4, the procedures (step B1 to step B6) up to the calculation of the circuit congestion degree after the terminal 2 establishes the TCP connection with the communication companion are similar to the procedures (step A1 to step A6) in the first embodiment explained along FIG. 2, and furthermore, the congestion window is increased with the procedure similar to that of the first embodiment (step B8) during the time that the packet discarding is not detected in the communication session (step B7: No). Herein, explanation of the procedures similar to that of the first embodiment is omitted.

When the terminal 2 detects the packet discarding (step B7: Yes), it decides the reduction rate of the congestion window with the following numerical formula 3, which is defined by the RTT, the minimum RTT, and the maximum RTT, in the congestion window reduction rate decider 2-11.

(Congestion window reduction rate)=((max $RTT$)−(mini $RTT$))/((max $RTT$)+$RTT$−(mini $RTT$)*5) numerical formula 3

According to the above-mentioned numerical formula 3, when the RTT is equal to the minimum RTT at the time of detecting the packet discarding (step B9: yes), that is, when it is estimated that no congestion exists even though the packet discarding has been detected, [1] is acquired as the reduction rate. In this case, the congestion window is not reduced, but the current size is maintained (step B10). On the other hand, when the RTT is equal to the maximum RTT (step B11: Yes), that is, when the possibility of occurrence of the congestion is high, [0.5], which is similar to the reduction rate at the time of detecting the packet discarding with the "TCP-Reno", i.e. the reduction rate allowing the size of the current congestion window to be halved is acquired as the congestion window reduction rate. Furthermore, during the time that the RTT is increased from the minimum RTT toward the maximum RTT (step B10: No, and step B11: No), the value ranging from [1] to [0.5] is acquired as the reduction rate of the congestion window, that is, the reduction amount of the congestion window is increased as the RTT increases.

The second embodiment explained above makes it possible to enhance the throughput, particularly, in a case where the packet discarding occurs due to the cause other than the congestion in addition to the effect according to the first embodiment because the reduced-width of the congestion window at the time of detecting the packet discarding is optimized. Furthermore, in a case where the cause of the packet discarding lies in the congestion occurrence, the congestion window is reduced with the control similar to that of the "TCP-Reno", thereby enabling fairness with the "TCP-Reno" to be secured.

Third Embodiment

Figure 5:
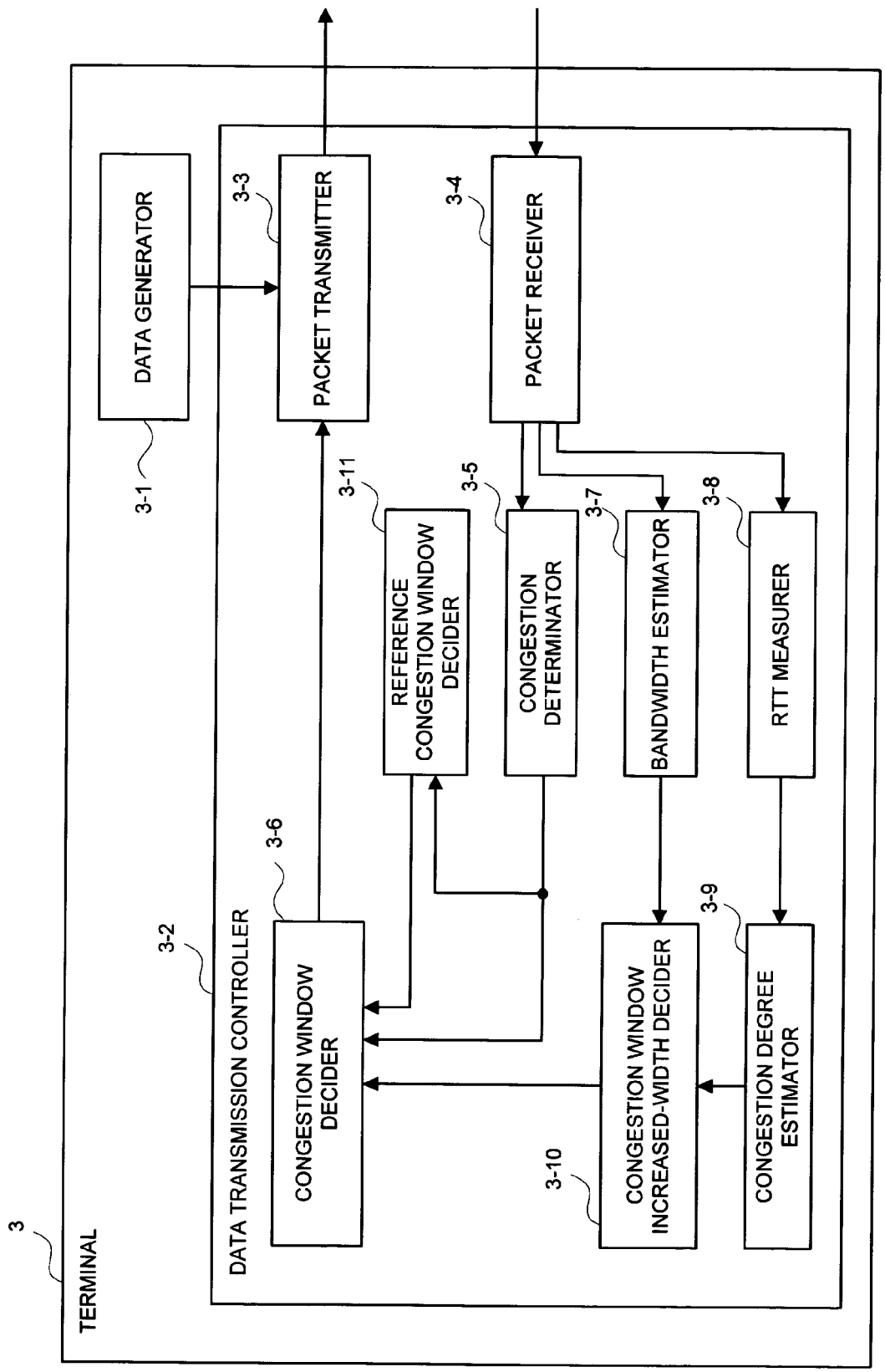
FIG. 5 is a block diagram illustrating a configuration of a third embodiment of the present invention.

FIG. 5 is a block diagram illustrating a configuration of the third embodiment of the present invention. In FIG. 5, codes relating to the codes of FIG. 1 are affixed to the portions that correspond to the configuration shown in FIG. 1. A terminal 3 of this embodiment includes a reference congestion window decider 3-11 for calculating the size of a reference congestion window provided in parallel to the congestion window in a data transmission controller 3-2 in addition to the configuration of the terminal 1 of FIG. 1.

The so-called reference congestion window is a virtual congestion window of which the size is increased/reduced with the procedure similar to that of the "TCP-Reno" in the congestion avoidance action irrespectively of the value of the circuit congestion degree or the RTT. The reference congestion window decider 3-11 sets the size of the reference congestion window to the value equal to the size of the congestion window at its time point in an initial state, i.e. at the starting time of the TCP connection or during the slow start action.

Figure 6:
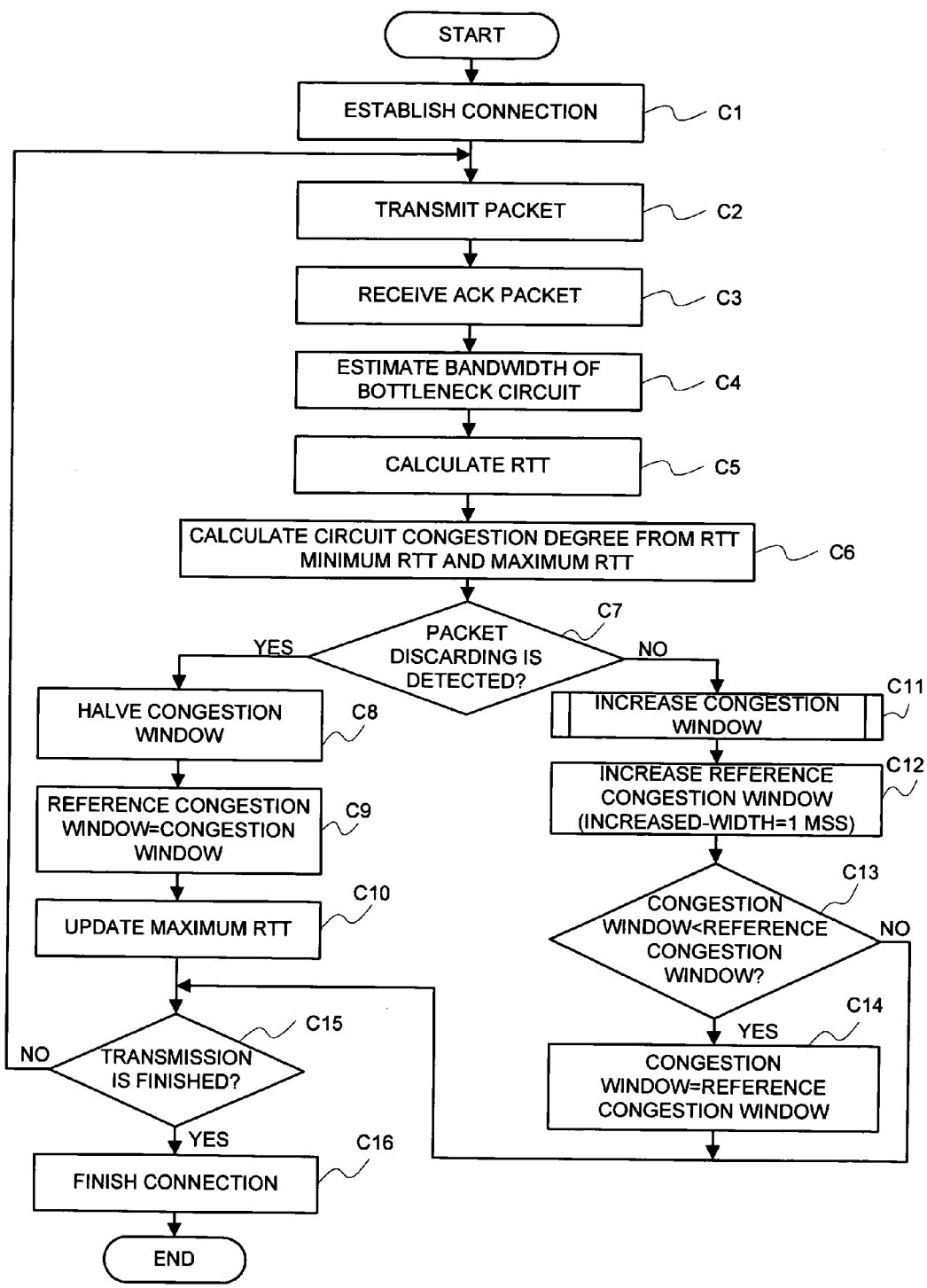
FIG. 6 is a flowchart illustrating an operational procedure of the third embodiment.

FIG. 6 is a flowchart illustrating an operational procedure of this embodiment. The operation of this embodiment will be explained by making a reference to FIG. 5 and FIG. 6. Additionally, with regard to the procedures shown in FIG. 6, explanation of the procedures similar to that of the first embodiment explained along FIG. 2 is omitted, and hereinafter, the procedures after determination of the packet discarding (step C7) are explained.

When the terminal 3 detects the packet discarding (step C7: yes), it halves the size of the congestion window similarly to the procedure of the "TCP-Reno" (step C8). At this moment, the reference congestion window decider 3-11 sets the size of the reference congestion window so that it becomes equal to the size of the halved congestion window (step C9).

On the other hand, during the time that the packet discarding is not detected in the congestion avoidance action (step C7: No), the terminal 3 decides the increased-width of the congestion window with the procedure similar to that of the first embodiment, and decides the size of the congestion window based upon its increased-width (step C11). During this time, the reference congestion window decider 3-11 increases the size of the reference congestion window by one MSS for each one RTT period similarly to the "TCP-Reno" without participation in a transit of the size on the congestion window side, and records its window size one by one (step C12).

When the congestion window decider 3-6 decides the size of the congestion window, it compares the size of the current congestion window to that of the reference congestion window (step C13), and in a case where the value of the reference congestion window exceeds that of the congestion window, it decides that the value of the reference congestion window is a new value of the congestion window, and enlarges the congestion window up to its value (step C14).

As mentioned above, in this embodiment, making a reference to the reference congestion window in deciding the size of the congestion window enables the throughput to be preventing from falling below that of the "TCP-Reno". In deciding the increased-width of the congestion window in this embodiment, for example, the next numerical formula 4 in which a lower limit of one MSS is not set for the increased-width differently from the case of the already-described numerical formula 2 can be employed.

$$I=(\text{estimated bandwidth})*p*B \qquad \text{Numerical formula 4}$$

In a case of employing the above-mentioned numerical formula 4, in a state where the RTT is close to the maximum RTT and yet the circuit congestion degree is estimated to be 100% (p≈0), the increased-width (I) of the congestion window becomes approximately [0], and the size of the congestion window is kept to the current one. That is, when the circuit congestion degree is high, it is possible to halt an increase in the congestion window and to wait for an increase in the reference congestion window by the "TCP-Reno", thereby allowing the fairness with the "TCP-Reno" to be enhanced all the more.

Furthermore, it is possible to add a function of the RTT like the case of the following numerical formula 5.

$$I=(\text{estimated bandwidth})*p*B+f(RTT) \qquad \text{Numerical formula 5}$$

Figure 9:
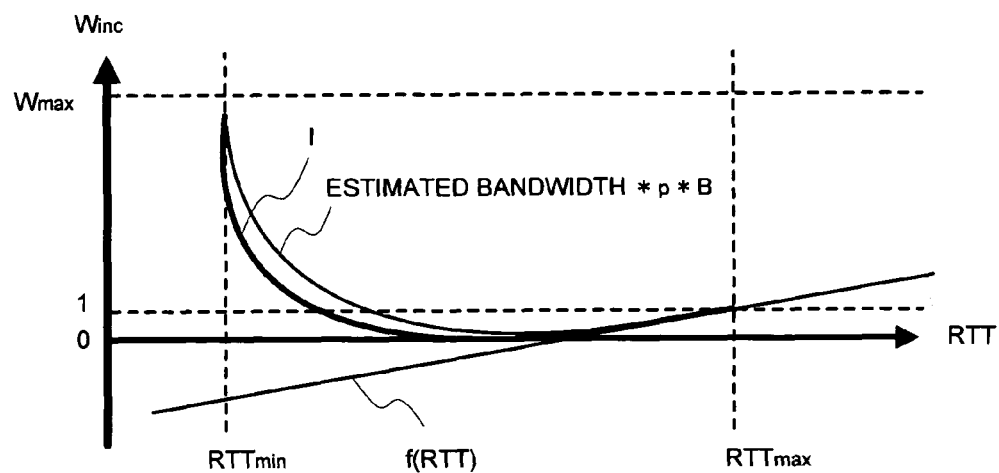
FIG. 9 is an explanatory view relating to calculation of the increased-width of the congestion window in the embodiments.

Herein, by assuming the function $\lfloor(RTT)\rfloor$ in the above-mentioned numerical formula 5 to be an increase function such that it has an inclination of increasing monotonously and yet becomes f(max RTT)=1 MSS, then the characteristic shown in FIG. 9 can be given to the increased-width (I). As apparent from FIG. 9, according to the above-mentioned numerical formula 5, when the circuit congestion degree is relatively low (P=1), that is, the RTT is relatively low (RTT≈RTT min), the increased-width allowing the congestion window to be enlarged at a high speed is calculated. Furthermore, when the increased-width is reduced as the RTT increases (RTT>RTT min), and in addition hereto, the circuit congestion degree becomes 100% (RTT≈RTT max, p=0) by the RTT being increased, the increased-width of the congestion window results in being decided by the control similar to the "TCP-Reno" (I=1MSS). In such a manner, the control employing the numerical formula 5 aims at further enhancing the fairness with the "TCP-Reno" by taking a control so as to implement the action similar to the "TCP-Reno" when the congestion degree is boosted to an extent in which the packet discarding occurs.

Furthermore, in deciding the increased-width and the reduction rate of the congestion window, it is also possible to employ the procedure described in Non-patent Document 3. In this case, the high throughput is attainable like the case of the procedure of Non-patent Document 3, and furthermore, using the reference congestion window together with the congestion window enables a decline also in the throughput at the time of competing with the "TCP-Reno" to be prevented.

Yet furthermore, in this embodiment, with regard to the window size, the value of the congestion window or the reference congestion window, which is larger, is applied for the congestion window; however it is not limited to this method, and for example, it is acceptable that the value of the congestion window allowing for an increase at a high-speed is employed when the RTT is relatively small, and the value of the reference congestion window is employed as the RTT becomes large.

According to the third embodiment explained above, using the reference congestion window, which is acquired with the control similar to that of the "TCP-Reno", together with the congestion window in addition to the effect by the first embodiment enables the fairness with the "TCP-Reno" to be further enhanced.

Fourth Embodiment

Figure 7:
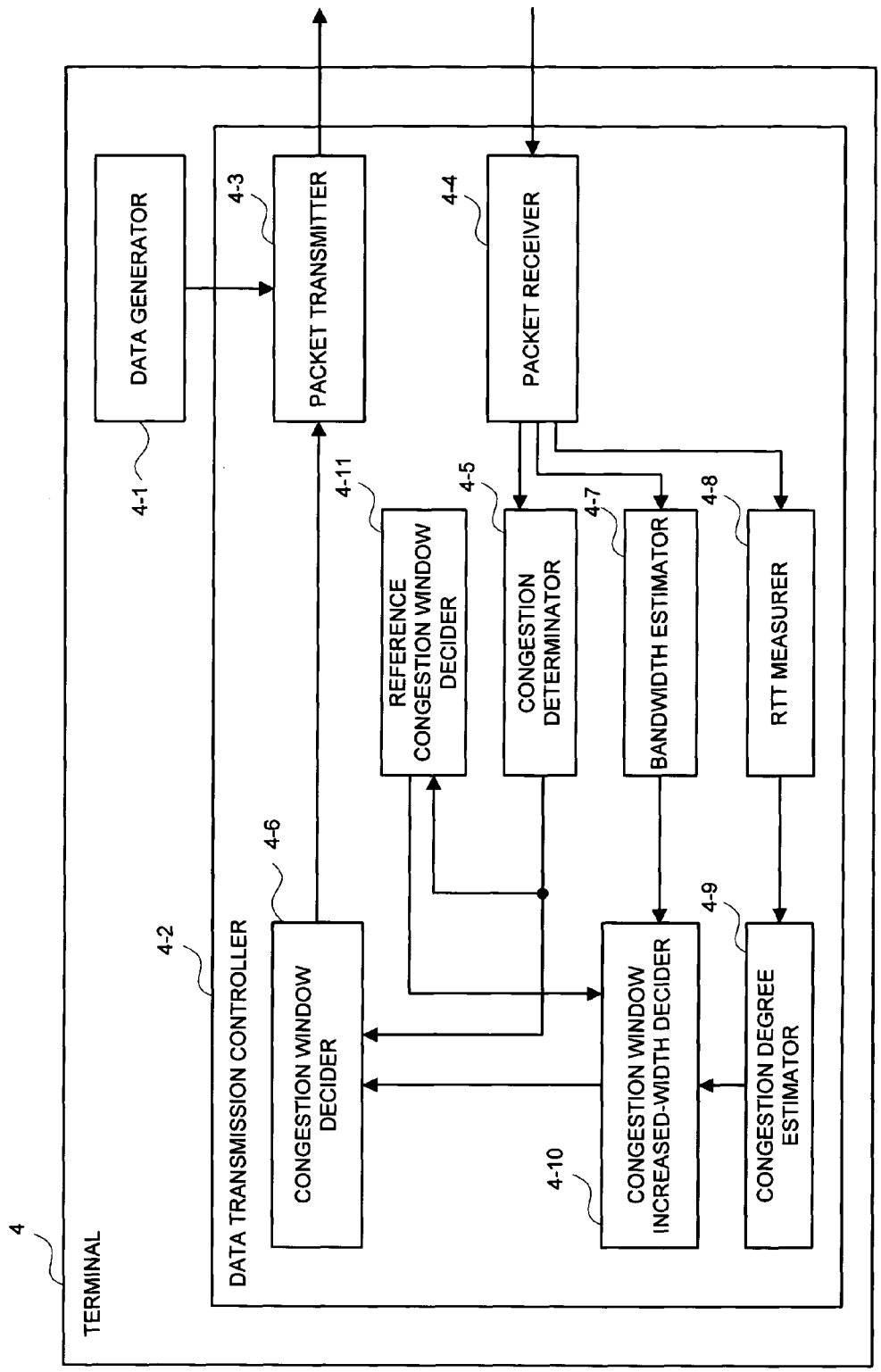
FIG. 7 is a block diagram illustrating a configuration of a fourth embodiment of the present invention.

FIG. 7 is a block diagram illustrating a configuration of the fourth embodiment of the present invention. A terminal 4 of this embodiment has a configuration similar to that of the third embodiment shown in FIG. 5, that is, includes a reference congestion window decider 4-11 for calculating the size of the reference congestion window in a data transmission controller 4-2 in addition to the configuration of the first embodiment.

Figure 8:
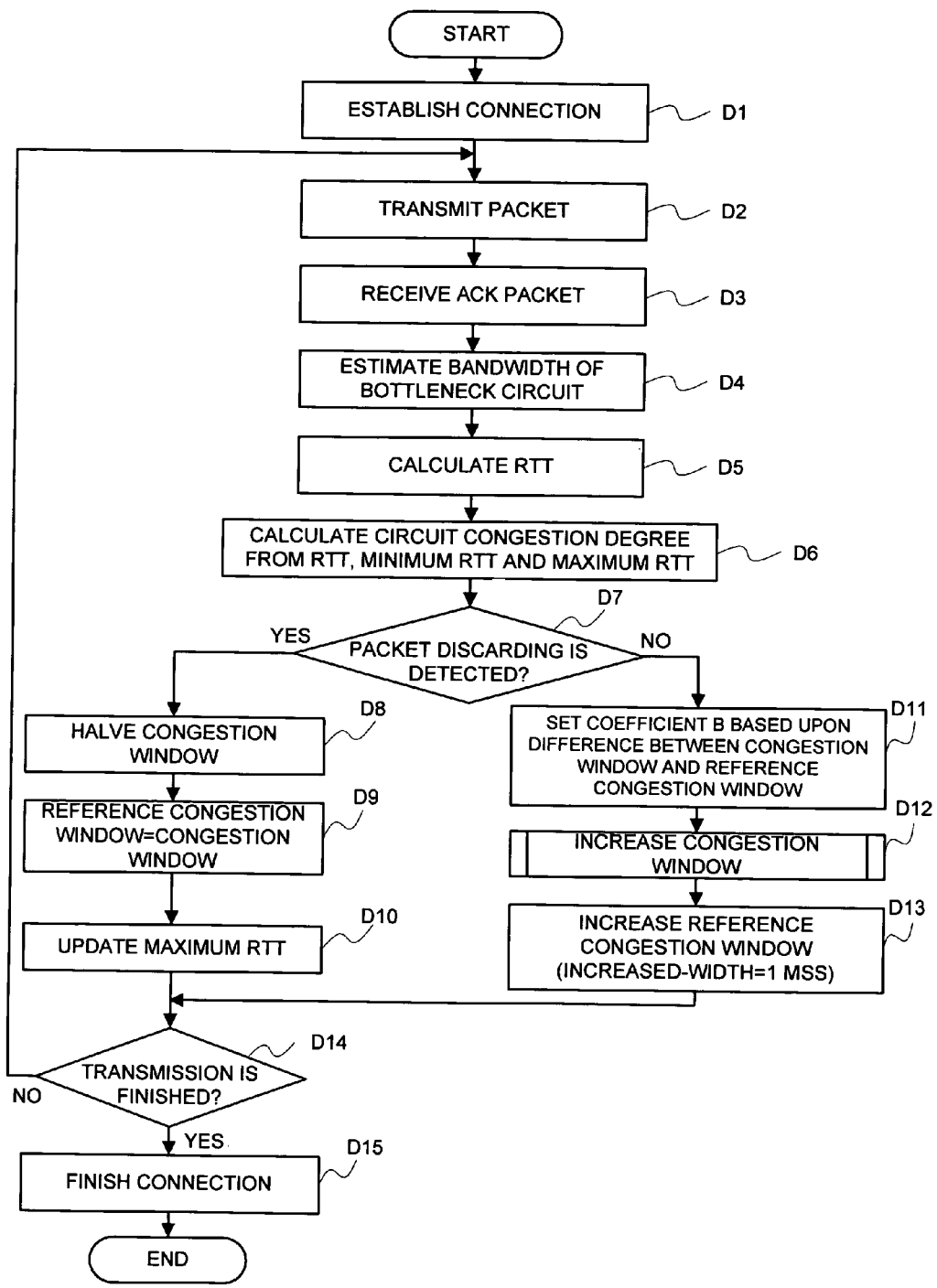
FIG. 8 is a flowchart illustrating an operational procedure of the fourth embodiment.

FIG. 8 is a flowchart illustrating an operational procedure of this embodiment. The operational procedure of this embodiment is similar to that of the third embodiment explained along FIG. 6 except for the following points, and explanation of the similar portion is omitted.

In this embodiment, in deciding the increased-width of the congestion window, the coefficient [B] in the numerical formula 4 or the numerical formula 5 explained in the third embodiment is dynamically set based upon a difference between the congestion window and the reference congestion window (step D11). This is for setting the value of the coefficient [B] so that the closer the RTT is to the maximum RTT, the larger it becomes, and for example, [B] can be decided with the function satisfying the condition shown in the following numerical formula 6.

When $RTT=(\text{mini } RTT), B=(\text{constant } a)$

When $RTT=(\text{max } RTT), B=(\text{constant } b)*((\text{reference congestion window})-(\text{congestion window}))$ Numerical formula 6

The fourth embodiment enables the increased-width of the congestion window to be flexibly set according to the state of the circuit in addition to the effect similar to that of the third embodiment.

In each embodiment explained above, as the signal propagation time in the present invention is employed the RTT that corresponds to the round-trip signal propagation time between the terminals; however in carrying out the present invention, a one-way signal propagation time between the terminals can be employed instead of the RTT. In this case, for example, the current time is pre-described in the packet that is to be transmitted from one terminal, and the other terminal, which has received this, calculates a difference between the reception time and the time described in its packet, and holds a difference time as the one-way signal propagation time. And, the held value is employed for calculating the circuit congestion degree.

Figure 10:
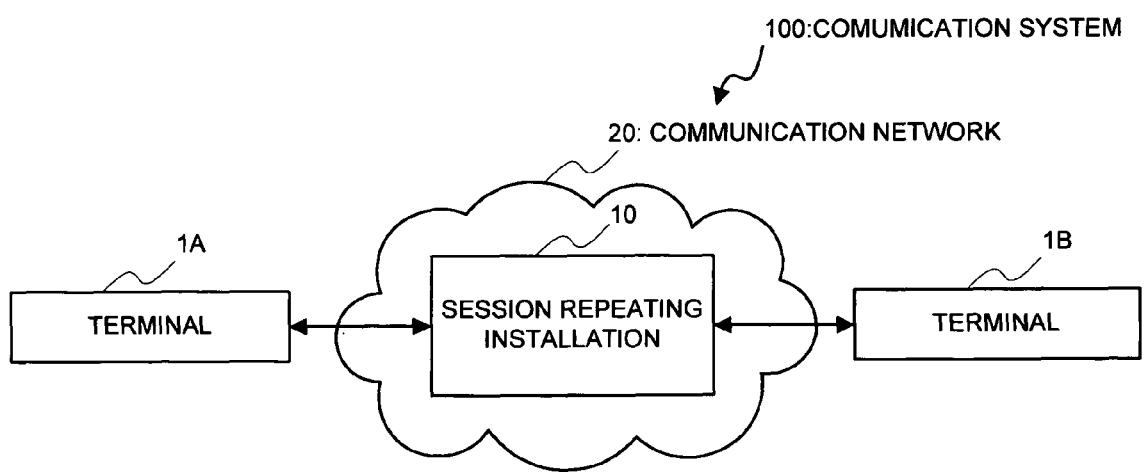
FIG. 10 is a block diagram illustrating a configuration of another embodiment of the present invention.

An application scope of the present invention is not limited to the terminal (1) explained above, and for example, as shown in FIG. 10, the present invention may be applied for a session repeating installation 10 for relaying a session between a terminal 1A and a terminal 1B connected via a network 20 in a communication system 100. This session repeating installation 10 is for making a relay between both terminals by, after finishing the session with one terminal for the time being, making a new session with the other terminal in the communication session between both terminals.

The communication protocol preferred for carrying out the present invention is the TCP explained in the above-mentioned embodiments; however it is not limited to this TPC, and the other communication protocol, which takes a congestion control, is acceptable.

What is claimed is:

1. A communication apparatus configured to implement a communication session based upon a congestion window for specifying a signal amount that can be continuously sent out to a network, said communication apparatus comprising:
    a congestion window size decider configured to decide a size of the congestion window that should be applied;
    an estimator configured to employ a signal propagation time in the communication session, thereby to estimate a congestion degree of a bottleneck circuit; and
    an increased-width decider configured to decide an increased-width of the congestion window in a congestion avoidance action based upon the estimated circuit congestion degree,
    wherein said estimator estimates said circuit congestion degree with a function signifying that the closer the signal propagation time at a current time point comes to a maximum value of the past signal propagation time, the higher the circuit congestion degree is.

2. The communication apparatus according to claim 1, wherein said increased-width decider decides a smaller value as the increased-width as the circuit congestion degree increases.

3. The communication apparatus according to claim 2, wherein a lower limit of said increased-width is assumed to be one packet of the signal amount.

4. The communication apparatus according to claim 1, comprising an estimator configured to estimate a bandwidth of said bottleneck circuit, wherein said increased-width decider employs the estimated bandwidth, thereby to decide said increased-width.

5. The communication apparatus according to claim 1, wherein the signal propagation time immediately before packet discarding occurs is employed as said maximum value.

6. The communication apparatus according to claim 1, wherein the existing maximum value or the value obtained by adding a predetermined value to a minimum value of the past signal propagation time, which is larger, is employed as said maximum value.

7. The communication apparatus according to claim 6, wherein the value that increases/decreases in proportion to the bandwidth of the bottleneck circuit is employed as said predetermined value.

8. The communication apparatus according to claim 1, comprising a reduction rate decider configured to decide a reduction rate of the congestion window in a congestion avoidance action, based upon the minimum and maximum values of the past signal propagation time and the signal propagation time at a current time point.

9. The communication apparatus according to claim 8, wherein said reduction rate decider decides as said reduction rate the value that allow the congestion window to be lessened all the more as the signal propagation time at a current time point increases.

10. The communication apparatus according to claim 8, wherein the value that allows a reduction in the congestion window to be halted when the signal propagation time at a current time point is equal to said minimum value is decided, and the value that allows the congestion window to be halved when the signal propagation time at a current time point is equal to said maximum value is decided, as said reduction rate.

11. The communication apparatus according to claim 1, comprising a calculator configured to calculate the size of a reference congestion window, which is provided in parallel to said congestion window and of which the increased-width is one packet of the signal amount, wherein said congestion window size decider decides the size of the reference congestion window or the size based upon said increased-width, which is larger, as the size of said congestion window.

12. The communication apparatus according to claim 11, wherein the value that allows an increase in said congestion window to be halted when the signal propagation time at a current time point is equal to said maximum value is decided as the increased-width of said congestion window.

13. The communication apparatus according to claim 11, wherein one packet of the signal amount the value is decided as the increased-width of said congestion window when the signal propagation time at a current time point is equal to said maximum value.

14. The communication apparatus according to claim 11, wherein an increased-width of said congestion window is changed responding to a difference between the size of said congestion window and the size of said reference congestion window.

15. The communication apparatus according to claim 1, said communication apparatus being a session repeating installation configured to relay a communication session to be implemented among a plurality of terminal apparatuses.

16. A communication method, wherein a communication apparatus configured to implement a communication session based upon a congestion window for specifying a signal amount that can be continuously sent out to a network employs a signal propagation time in a communication session, said method comprising:
  estimating a congestion degree of a bottleneck circuit;
  deciding an increased-width of the congestion window in a congestion avoidance action based upon the estimated circuit congestion degree; and
  deciding a size of the congestion window, which should be applied, based upon said increased-width when the congestion window is enlarged,
  wherein said communication apparatus estimates said circuit congestion degree with a function signifying that the closer the signal propagation time at a current time point comes to a maximum value of the past signal propagation time, the higher the circuit congestion degree is.

17. The communication method according to claim 16, wherein said communication apparatus decides a smaller value as the increased-width as the circuit congestion degree increases.

18. The communication method according to claim 17, wherein said communication apparatus assumes a lower limit of said increased-width to be one packet of the signal amount.

19. The communication method according to claim 16, wherein said communication apparatus further estimates a bandwidth of said bottleneck circuit, and employs the estimated bandwidth, thereby to decide said increased-width.

20. The communication method according to claim 16, wherein said communication apparatus employs the signal propagation time immediately before packet discarding occurs as said maximum value.

21. The communication method according to claim 16, wherein said communication apparatus employs the existing maximum value or the value obtained by adding a predetermined value to a minimum value of the past signal propagation time, which is larger, as said maximum value.

22. The communication method according to claim 21, wherein said communication apparatus employs the value that increases/decreases in proportion to the bandwidth of the bottleneck circuit as said predetermined value.

23. The communication method according to claim 16, wherein said communication apparatus further decides a reduction rate of the congestion window in a congestion avoidance action, based upon the minimum and maximum values of the past signal propagation time and the signal propagation time at a current time point, and decides the size of the congestion window based upon said reduction rate when the congestion window is reduced.

24. The communication method according to claim 23, wherein said communication apparatus decides as said reduction rate the value that allow the congestion window to be lessened all the more as the signal propagation time at a current time point increases.

25. The communication method according to claim 23, wherein said communication apparatus decides the value that allows a reduction in the congestion window to be halted when the signal propagation time at a current time point is equal to said minimum value, and decides the value that allows the congestion window to be halved when the signal propagation time at a current time point is equal to said maximum value and yet a delay is large, as said reduction rate.

26. The communication method according to claim 16, wherein said communication apparatus further calculates the size of a reference congestion window, which is provided in parallel to said congestion window and of which the increased-width is one packet of the signal amount, and decides the size of the reference congestion window or the size based upon said increased-width, which is larger, as the size of said congestion window.

27. The communication method according to claim 26, wherein said communication apparatus decides the value that allows an increase in said congestion window to be halted when the signal propagation time at a current time point is equal to said maximum value as the increased-width of said congestion window.

28. The communication method according to claim 26, wherein said communication apparatus decides one packet of the signal amount as the increased-width of said congestion window when the signal propagation time at a current time point is equal to said maximum value.

29. The communication method according to claim 26, wherein said communication apparatus changes an increased-width of said congestion window responding to a difference between the size of said congestion window and the size of said reference congestion window.

* * * * *

UNITED STATES PATENT AND TRADEMARK OFFICE
CERTIFICATE OF CORRECTION

PATENT NO. : 7,778,164 B2
APPLICATION NO. : 11/342666
DATED : August 17, 2010
INVENTOR(S) : Hideyuki Shimonishi It is certified that error appears in the above-identified patent and that said Letters Patent is hereby corrected as shown below:

Column 8, line 32, delete

" (Congestion window reduction rate)=((max $RTT$)-(mini $RTT$))/((max $RTT$)+$RTT$-(mini $RTT$)*2)Numerical formula 3 "

and insert

-- (Congestion window reduction rate) = ((max $RTT$) − (mini $RTT$)) / ((max $RTT$) + $RTT$ − (mini $RTT$) * 2)      Numerical formula 3 --

Column 10, line 10 delete " $\lfloor (RTT) \rfloor$ " and insert -- $\lceil f(RTT) \rceil$ " --

Signed and Sealed this

Seventh Day of December, 2010

David J. Kappos
*Director of the United States Patent and Trademark Office*